United States Patent [19]
Uber et al.

[11] Patent Number: 5,797,481
[45] Date of Patent: Aug. 25, 1998

[54] MODULAR CONVEYOR SYSTEM

[75] Inventors: John E. Uber, Trumansburg, N.Y.; Carl A. Matson, Warren Center, Pa.; Eugene A. Helmetsie, Spencer, N.Y.

[73] Assignee: Hi-Speed Checkweigher Co., Inc., Ithaca, N.Y.

[21] Appl. No.: 591,932

[22] Filed: Jan. 29, 1996

[51] Int. Cl.$^6$ ................................................ B65G 15/00
[52] U.S. Cl. ........................ 198/813; 198/816; 198/817; 198/861.1
[58] Field of Search ................ 198/861.1, 583, 198/813, 816, 817

[56] References Cited

U.S. PATENT DOCUMENTS

| | | | |
|---|---|---|---|
| 2,610,725 | 9/1952 | Schieser et al. | 198/463.4 |
| 3,004,572 | 10/1961 | Urschel et al. | 198/817 X |
| 3,583,327 | 6/1971 | Arndt | 198/861.1 X |
| 3,638,743 | 2/1972 | Douglas | 177/16 |
| 3,921,793 | 11/1975 | Hutchinson et al. | 198/813 |
| 4,023,668 | 5/1977 | De Santo | 177/16 |
| 4,146,126 | 3/1979 | Mattos | 198/861.1 |
| 4,433,774 | 2/1984 | Lopes | 198/861.1 X |
| 4,556,143 | 12/1985 | Johnson | 198/817 X |
| 4,803,804 | 2/1989 | Bryant | 198/813 X |
| 4,925,009 | 5/1990 | Hill | 198/583 |
| 5,129,507 | 7/1992 | Maeda et al. | 198/861.1 X |
| 5,304,745 | 4/1994 | Rusk et al. | 177/50 |
| 5,562,202 | 10/1996 | Newcomb et al. | 198/861.1 |

FOREIGN PATENT DOCUMENTS

| | | | |
|---|---|---|---|
| 2604424 | 4/1988 | France | 198/861.1 |
| 20413 | 1/1992 | Japan | 198/861.1 |
| 1662906 | 7/1991 | U.S.S.R. | 198/861.1 |
| 2183584 | 6/1987 | United Kingdom | 198/861.1 |

OTHER PUBLICATIONS

No Metal. Trust Icore.—Sales Literature—Sep. 1981.

*Primary Examiner*—David A. Bucci
*Attorney, Agent, or Firm*—Bean, Kauffman & Snyder

[57] ABSTRACT

A modular conveyor system is disclosed as including an unique supporting framework featuring a horizontally elongated spine (12); legs (32) for supporting spine (12); posts (34) upstanding from legs (32); and an elongated rail (18) supported by posts (34) and arranged above and in a horizontally offset relationship relative to spine (12). Spine (12) serves to support one or more modular conveyor units (66), rail (18) serves to support one or more diverse art devices (48) required to be associated with conveyor units (66); and posts (34) serve to support a side panel (24) to extend lengthwise of spine (12).

33 Claims, 9 Drawing Sheets

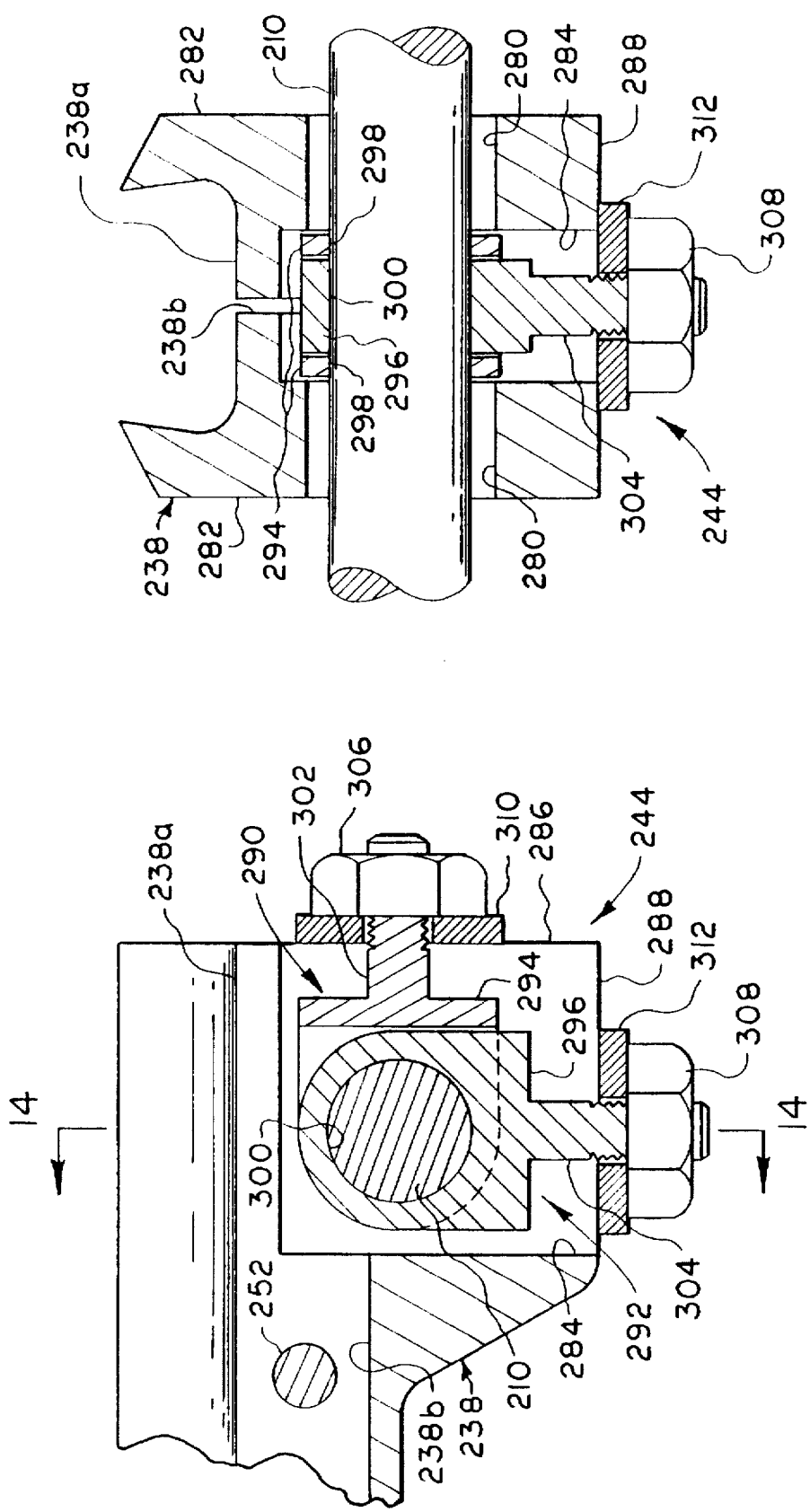

5,797,481

MODULAR CONVEYOR SYSTEM

BACKGROUND OF THE INVENTION

Conveyor mechanisms are typically designed and constructed as unique units with little attempt having been made to use common or standard parts in the manufacture of conveyor mechanisms differing in size and/or function. Thus, prior conveyor mechanisms are oftentimes expensive and time-consuming to manufacture.

SUMMARY OF THE INVENTION

The present invention is directed towards a modular conveyor system employing numerous standard parts allowing their use in the manufacture of multiple conveyor mechanisms with a reduction in overall construction costs and time required to design and manufacture such mechanisms.

The invention contemplates in the first instance, the utilization of an unique supporting framework including a horizontally-elongated spine, a pair of supports depending one from each end of the spine, a pair of standards upstanding one from each support, and at least one elongated rail having its opposite ends connected to mounting portions defined by the upper ends of the standards.

The spine serves as a common support for modular conveyor units required to be employed in forming a given conveyor mechanism, and the rail serves as a common support for diverse art devices, such as conveyed article detection sensors and improper weight article ejection devices, required to be associated with the modular conveyor units. Thus, the overall length of the conveyor unit supporting framework may be varied as required by a given conveyor mechanism by simply cutting the spine and rails to a desired length and then joining same to suitable supports and standards.

The invention further contemplates a unique arrangement for removably and adjustably mounting the modular conveyor units on the spine, and unique modular units employing diverse types of conveyor elements.

In a first modular conveyor unit suitable for employing a belt-type conveyor element to transport articles across a load cell for weighing purposes, improved arrangements are disclosed for removably supporting the conveyor belt above a load cell and for adjustably controlling the tension of the conveyor belt.

In a second modular conveyor unit suitable for employing a chain-type conveyor to transport articles across a load cell, an improved arrangement is provided to adjustably control positioning of the conveyor chain elements.

BRIEF DESCRIPTION OF THE DRAWINGS

The nature and mode of operation of the present invention will now be more fully described in the following detailed description taken with the accompanying drawings wherein:

FIG. 13 is a sectional view taken generally along the line 13—13 in FIG. 11;

FIG. 14 is a sectional view taken generally along the line 14—14 in FIG. 13.

DETAILED DESCRIPTION

Figure 1:
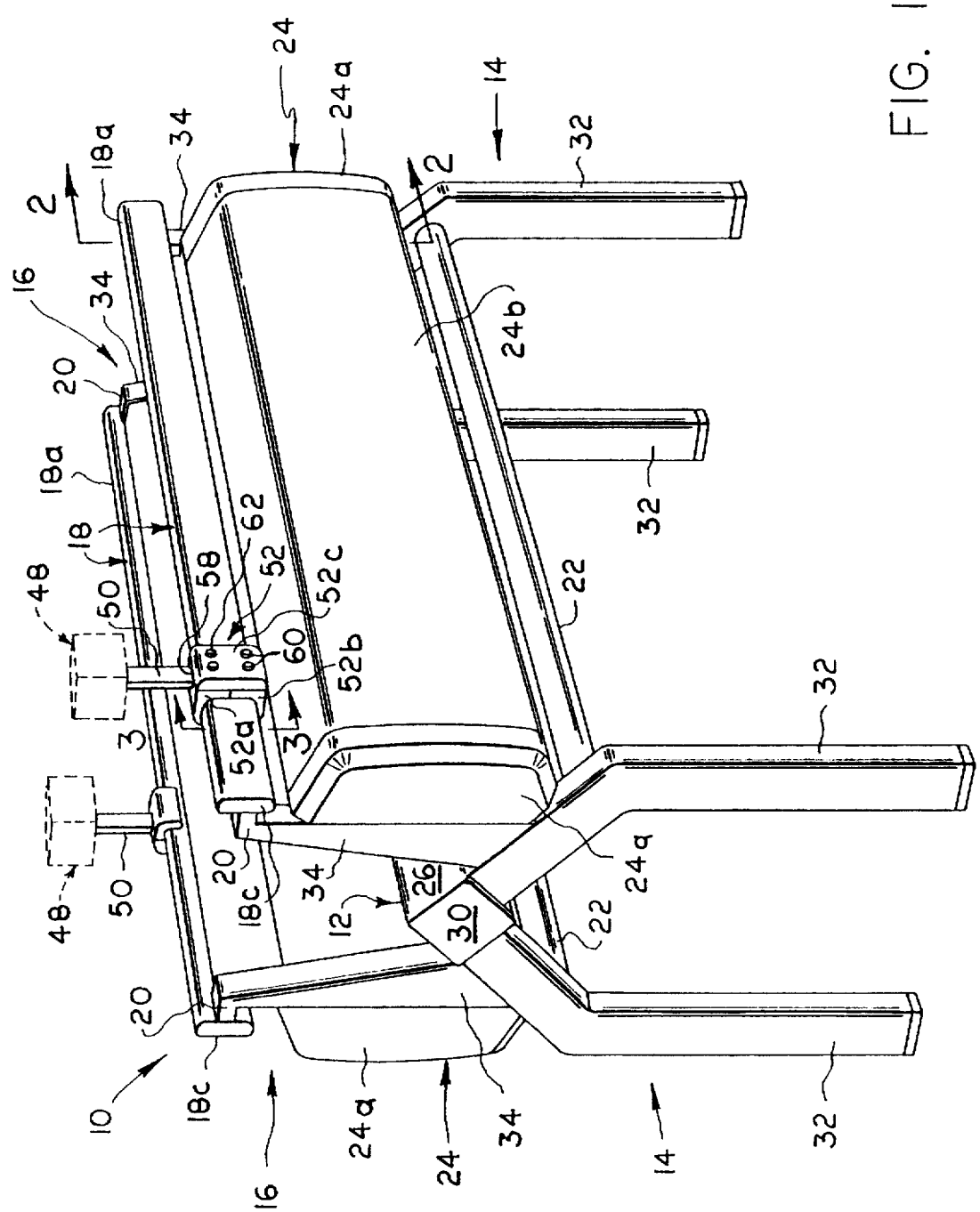
FIG. 1 is a prospective view showing the preferred construction of a supporting framework intended for use in the present modular conveyor system.

Reference is first made to FIGS. 1–4, wherein a supporting framework intended for use in the modular conveyor system of the present invention is generally designated as 10 and shown as including a basic framework construction comprising a horizontally elongated spine 12, a pair of supports 14 and 14 depending one from each end of the spine, a pair of standards 16 and 16 upstanding one from each of the supports, and at least one, and preferably two, elongated rails 18 and 18 mounted adjacent their opposite ends on the standards by mounting portions 20 and 20 such that the rails are disposed above the spine in a parallel, horizontally offset relationship relative thereto. Framework 10 may be completed by a pair of parallel reinforcing or stabilizing tubes 22 and 22 having their ends secured, as by welding, to supports 14 and 14, and a pair of side or cover panels 24 and 24 mounted on standards 16 and 16 in the manner best shown in FIGS. 2–4.

Figure 6:
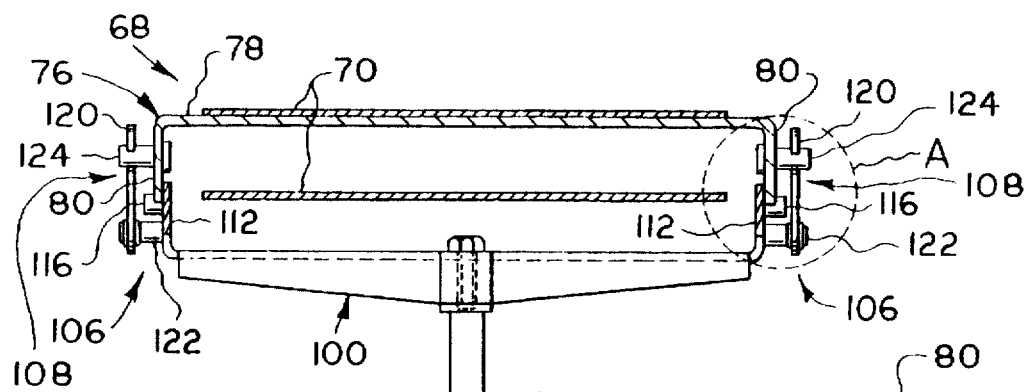
FIG. 6 is a side elevational view showing for example one type of modular conveyor adapted for mounting in the framework 6—6 in FIG. 5.
Figure 7:
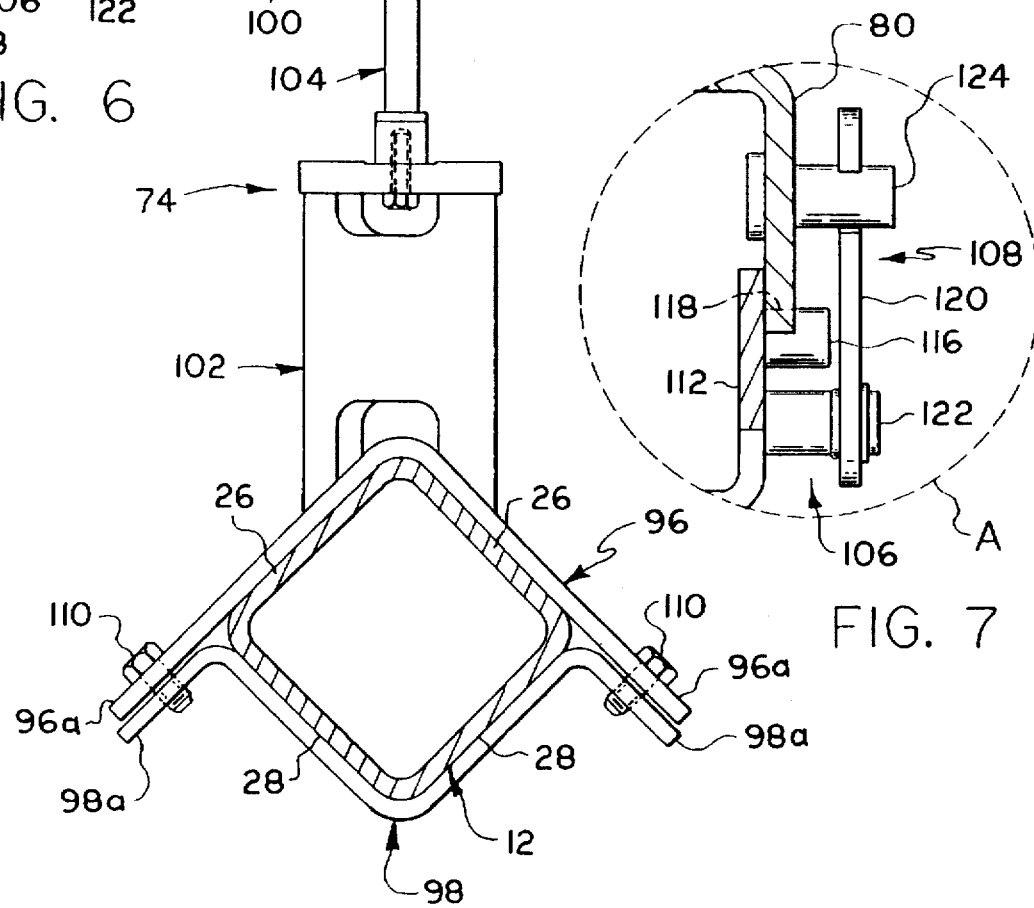
FIG. 7 is an enlarged view of the area designated as A in FIG. 6.

Spine 12 is preferably defined by a hollow, square cross-sectioned tube having a first pair of adjacent side surfaces 26 and 26 arranged to assume an inverted, generally V-shaped configuration, and to define an upwardly facing clamping surface and a second pair of adjacent side surfaces 28 and 28 arranged to assume a generally V-shaped configuration and to define a downwardly facing clamping surface, as best shown in FIG. 6; and a pair of end caps only one of which is shown at 30 in FIG. 1.

Supports 14 and 14 are of like construction and each comprises a pair of legs 32 and 32 having their upper ends secured preferably by welding to second side surfaces 28 and 28 of spine 12 and their lower ends suitably ground supported, such as by adjustable shoes or casters, not shown. Legs 32 and 32 are preferably defined by square tubes and reinforced by cylindrical tubes 22 and 22.

Figure 2:
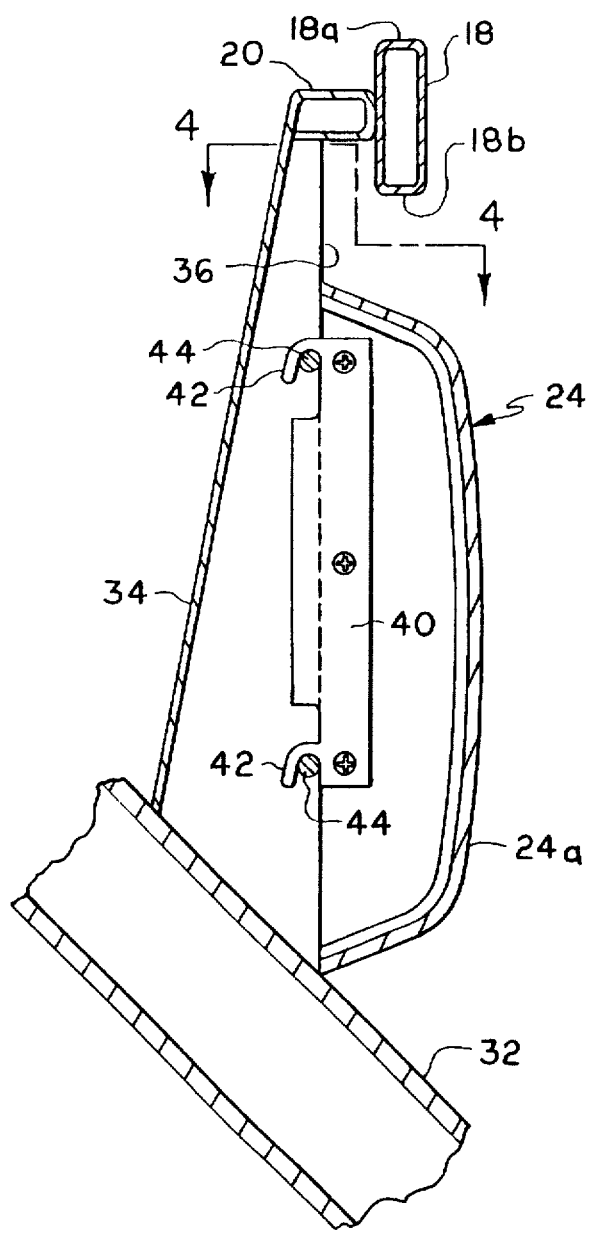
FIG. 2 is a sectional view taken generally along the line 2—2 in FIG. 1.
Figure 3:
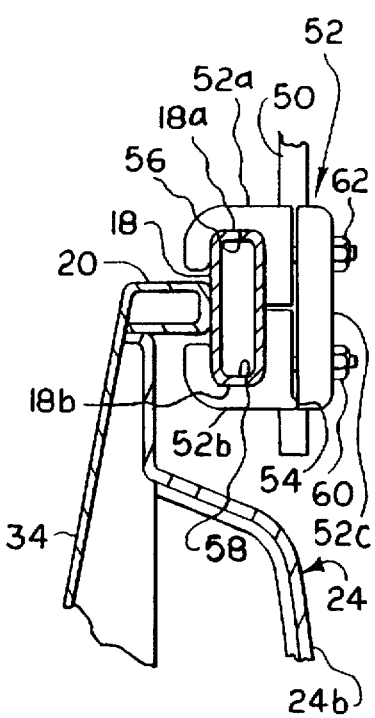
FIG. 3 is a sectional view taken generally along the line 3—3 in FIG. 1.
Figure 4:
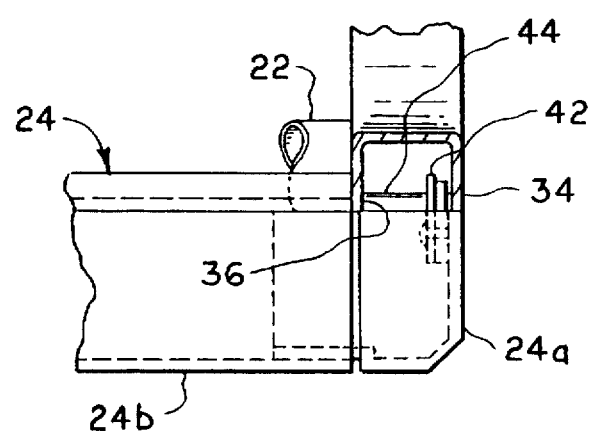
FIG. 4 is a sectional view taken generally along the line 4—4 in FIG. 2.

Standards 16 and 16 are of like construction and each comprises a pair of posts 34 and 34 having their lower ends secured preferably by welding one to each of legs 32 and 32. Each of posts 34 is preferably of U-shaped cross-section, thereby to define transversely outwardly facing mounting opening, only one of which is shown at 36 in FIGS. 2 and 4, with each of their upper ends shaped to define one of mounting portions 20, as best shown in FIG. 2. Preferably, mounting portions 20 are fixed to opposite ends of rails 18, as by welding, at a point spaced equidistance from upper and lower lengthwise extending edges 18a and 18b of the rails, as best shown in FIGS. 2 and 3. The ends of rails 18 and 18 may be closed by suitably mounted end caps 18c.

By again referring to FIGS. 2 and 4, it will be noted that side panels 24 and 24 each include a pair of end caps 24a and 24a and a central portion 24b, and that the side panels are mounted on posts 34 and 34 by internally fitting the end caps with mounting plates 40, which define mounting hooks 42 adapted to overlie in engagement with standard mounting means in the form of a pair of mounting rods 44 and 44 arranged to extend horizontally and transversely within each post 34 adjacent its mounting opening 36. End caps 24a and 24a may be attached to a panel central portion 24b by suitable means, such as by adhesive.

Rails 18 and 18 are preferably formed with a length corresponding to that of spine 12 whose length is in turn determined by the effective length of the modular conveyor units intended to be mounted on framework 10. Rails 18 and 18 are each intended to mount one or more art devices shown for example in broken line at 48, which are required by the type of conveyor unit to be mounted on framework 10. It is contemplated that each art device 48 would be provided with a depending support rod 50, which has its lower end vertically adjustably mounted by a multiple part clamp assembly 52, which is in turn horizontally adjustably mounted on one of rails 18. In the type of clamp assembly shown in FIGS. 1 and 3, first and second parts 52a and 52b are formed with facing clamping recesses 54 and 56 shaped and sized to loosely slidably engage with upper and lower edges 18a and 18b of rail 18, and a third part 52c cooperates with first part 52a to define a mounting opening 58 for slidably receiving support rod 50. Pivotal or tilting movement of second part 52b relative to first part 52a about a pivot axis defined by a rib 54 for purposes of clamping rail 18 within recesses 56 and 58 is effected by a first adjustment means including a pair of threaded adjustment bolts 60 loosely passing through part 52c and threadably received by second part 52b. Movement of third part 52c relative to first part 52a to effect clamping of support rod 50 within mounting opening 58 is effected by a second adjustment means including a pair of threaded bolts 62 loosely passing through third part 52c and threadably received by first part 52a. A more complete description of the construction and mode of operation of clamp assembly 52 may be had by reference to commonly assigned U.S. Pat. No. 5,701,991 (filed concurrently herewith).

Reference is now made to FIGS. 5–9, which show a modular conveyor unit 66 formed in accordance with one form of the present invention and intended for mounting on spine 12. Conveyor unit 66 generally includes a frame 68; an endless conveyor element such as a belt 70; drive means 72 for effecting movement of the belt relative to the frame along a path of travel extending lengthwise of the frame and spine 12; and mounting means 74 for adjustably mounting the conveyor unit in a selected position lengthwise of the spine.

Figure 5:
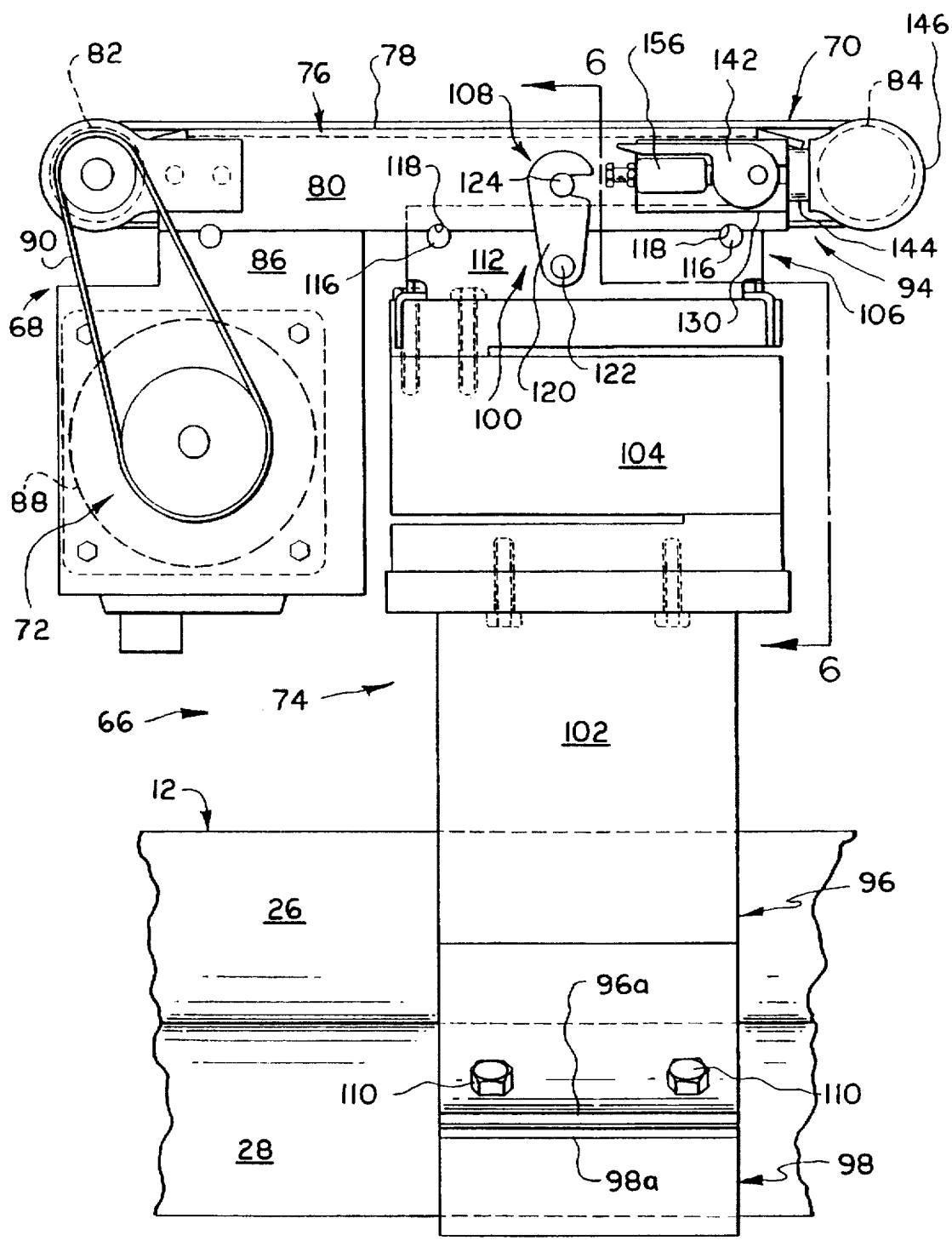
FIG. 5 is a side elevational view showing for example one type of modular conveyor adapted for mounting in the framework of FIG. 1.

Frame 68 is shown in FIGS. 5 and 6 as including an elongated, inverted U-shaped frame member or platform 76 having a horizontally disposed upper panel 78 serving to slidably support an upper flight of belt 70, during passage thereof between infeed and outfeed ends of the frame member, and a pair of parallel, dependant side mounting flanges, 80 and 80. Frame member 76 mounts end guide members shown generally as being in the form of drive and idler rollers 82 and 84, which are arranged adjacent its infeed and outfeed ends, and a depending bracket 86 serving to mount a conveyor drive motor 88 suitably connected to drive roller 82, as by drive belt 90. Preferably, opposite ends of idler roller 84 are adjustably supported on frame member 76 by a pair of belt tensioning devices 94, which are of mirror image construction and mounted one on each of dependant side mounting flanges 80 and 80. Only one of the tensioning devices is specifically illustrated in FIGS. 5, 8, and 9.

Conveyor unit mounting means 74 is shown in FIGS. 5 and 6 as including first and second spine mounting or clamping brackets 96 and 98, which are arranged to releasably and adjustably clampingly engage with spine 12; a connector bracket 100 coupled to and arranged to overlie first bracket 96 by a standard 102 and a load cell 104; positioning means 106 for releasably supporting frame member 76 on connector bracket 100 in a fixed position relative thereto in a direction extending lengthwise of spine 12; and a latching device 108 for releasably retaining the frame member in its fixed position.

In FIG. 6, first mounting bracket 96 is shown as having an inverted V-shaped configuration provided with parallel free edge portions 96a and 96a, and second mounting bracket 98 is shown as having an M-shaped configuration provided with parallel free edge portions 98a and 98a. When brackets 96 and 98 are arranged for clamping surface to surface engagement with upwardly and downwardly facing clamping surfaces 26 and 28 of spine 12, as shown in FIG. 6, associated pairs of edge portions 96a and 98a are arranged closely adjacent one another for receipt of clamping means, such as threaded fasteners 110, which are adapted to draw the brackets into clamping engagement with the clamping surfaces. With this mounting arrangement, conveyor unit 66 may be quickly removably mounted on spine 12 in a selectively adjusted position lengthwise thereof.

Connector bracket 100 is shown in FIG. 6 as having a pair of parallel upstanding side flanges 112 arranged for slidably surface engagement to surface with side flanges 80 of frame member 76, whereby to locate the frame member in a direction extending transversely of spine 12. Positioning means 106 preferably includes a pair of parallel pins 116 and 116 which are fixed to each of upstanding flanges 112 to extend horizontally transversely of spine 12; and a pair of edge-opening recesses 118 and 118, which are formed in each of dependant side flanges 80 and sized to removably slidably receive pins 116 upon lowering of frame 76 downwardly onto connector bracket 100. Frame 76 is releasably retained in a fixed position relative to connector bracket 100, as determined by engagement of pins 116 and recesses 118, by a pair of latching devices 108 and 108, which preferably include a pair of latch fingers 120 and 120 pivotally supported on upstanding side flanges 112 and 112 by pivot pins 122 and 122, and a pair of cooperating latch pins 124 and 124 fixed to dependant side flanges 80 and 80. It is contemplated that the parts of positioning means 106 and latch device 108 may be reversed.

Figure 8:
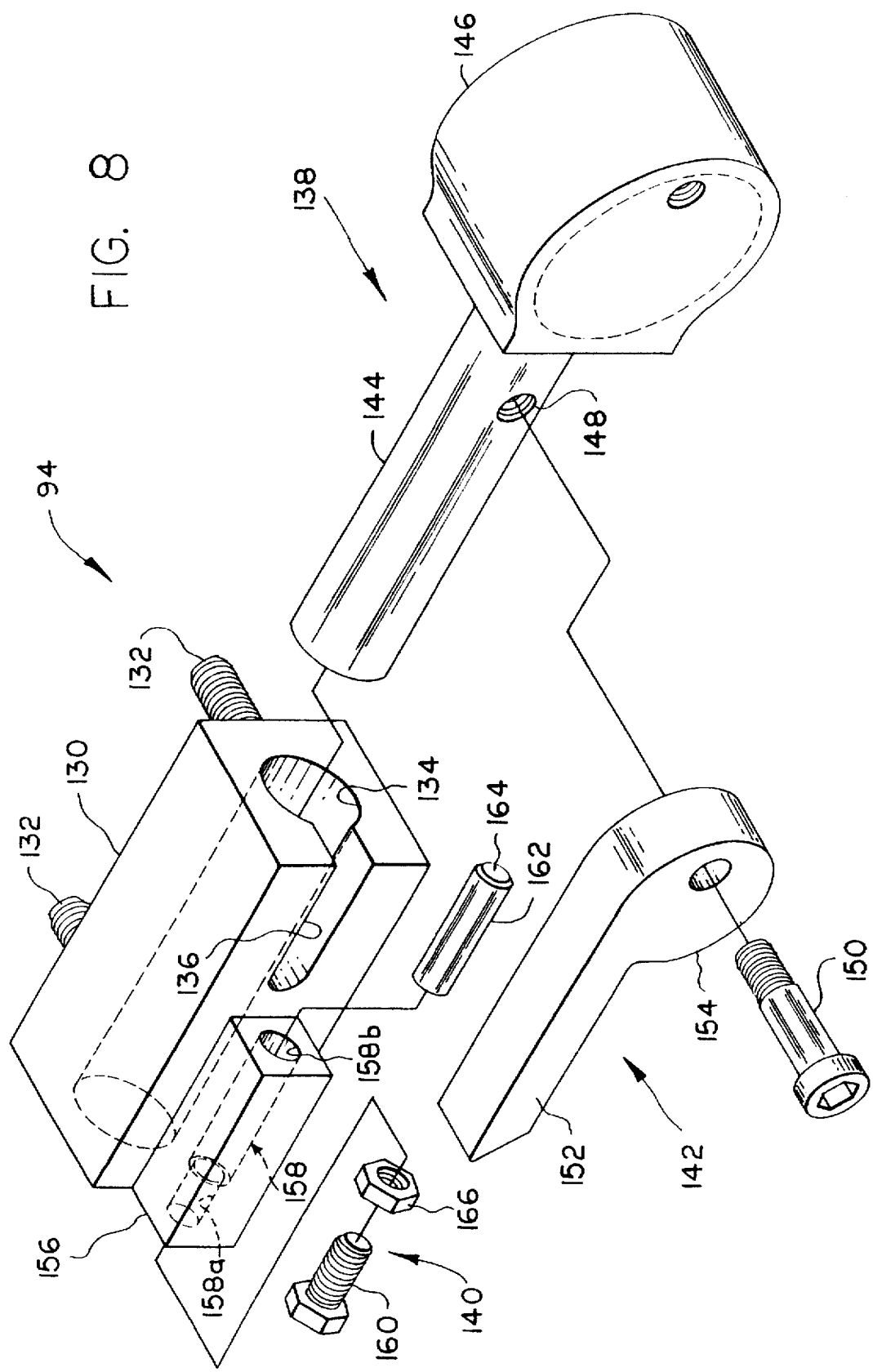
FIG. 8 is an exploded prospective view of a conveyor belt adjustment mechanism.

A tensioning device 94 formed in accordance with the present invention is best shown in FIG. 8 as including guide means in the form of a guide block 130, which is suitably fixed to an associated one of dependant flanges 80 by a pair of mounting bolts 132 and defines a cylindrical guide or bore opening 134 extending therethrough in a direction aligned with the path of travel of conveyor belt 70 and a slot 136 arranged to open radially and extend lengthwise of opening 134; a slide member 138; a tension adjustment means 140; and an operator 142. Slide number 138 has a first end in the form of a cylindrical pin 144 sized to be removably slidably supported within guide opening 134 and a second end in the form of an enlarged head portion 146 adapted for supporting one end of idler roller 84. Pin 144 is provided with a transversely opening threaded opening 148 for receiving a threaded stud 150 serving to rotatably mount operator 142 for manually induced movement between tension release and tensioning positions shown in FIGS. 9 and 5, respectively, with stud 150 being slidably received within slot 136 to prevent rotation of pin 144 within guide opening 134. Operator 142 is characterized as having a handle portion 152 and a cam surface, 154. Adjustment means 140 includes a mounting block 156, which is fixed to guide block 130 and defines an adjustment opening 158 disposed parallel to guide opening 134. Adjustment opening 158 has one end 158a threaded to adjustably receive an adjustment bolt 160 and an opposite cylindrical end 158b for slidably supporting an adjustment pin 162 whose inner end is arranged to be engaged by the adjustment bolt and whose outer end serves to define a reference surface 164 arranged for engagement with operator cam surface 154. A locking or clamping nut 166 may be threaded onto adjustment bolt 160 for engagement with an end surface of mounting block 156 peripherally of first end 158a of opening 158 in order to prevent undesired rotations of such bolt.

Figure 9:
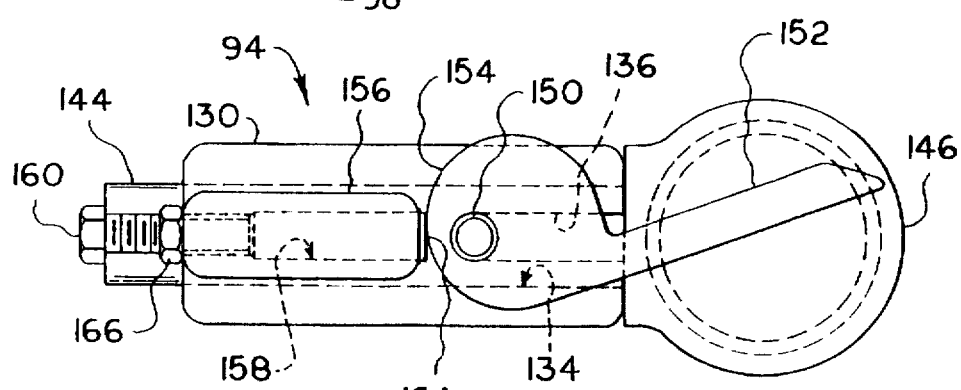
FIG. 9 is a side elevational view of the conveyor belt adjustment mechanism in tension release position.

Conveyor belt 70 may be mounted on frame 76 and trained about drive roller 82 and 84, while frame 76 is removed from supporting engagement with connector bracket 100 and operator 142 is in its tension release position of FIG. 9. Thereafter conveyor belt 70 may be tensioned by rotating operator 142 of each tensioning device into its tensioned position of FIG. 5, as an incident to which cam surface 154 is caused to slidably engage with reference surface 164 and thereby force slide member 138 to move in a direction extending outwardly of guide opening 134 such that the distance between rollers 82 and 84 is increased. The amount of tension imparted to conveyor belt 70 may be adjustably varied by threaded adjustments of adjustment bolt 160 relative to first end 158a of adjustment opening 158. It will be understood that the operators of both tension devices 94 would normally be simultaneously operated for conveyor belt tensioning and release purposes.

The illustrated construction of tensioning devices 94 is such that their components may be completely disassembled for cleaning purposes.

Reference is now made to FIGS. 10–14 which show a second form of modular conveyor unit generally designed as 200 and adapted for mounting on spine 12 in the same manner as that described with reference to unit 66. In this form of the invention, separately formed infeed, weighing and discharge sections 202, 204 and 206 are individually and adjustably supported on common spine 12 and coupled by two or more common, continuous conveyor chain elements 208 moveable along a path of travel extending lengthwise of the spine.

Figure 11:
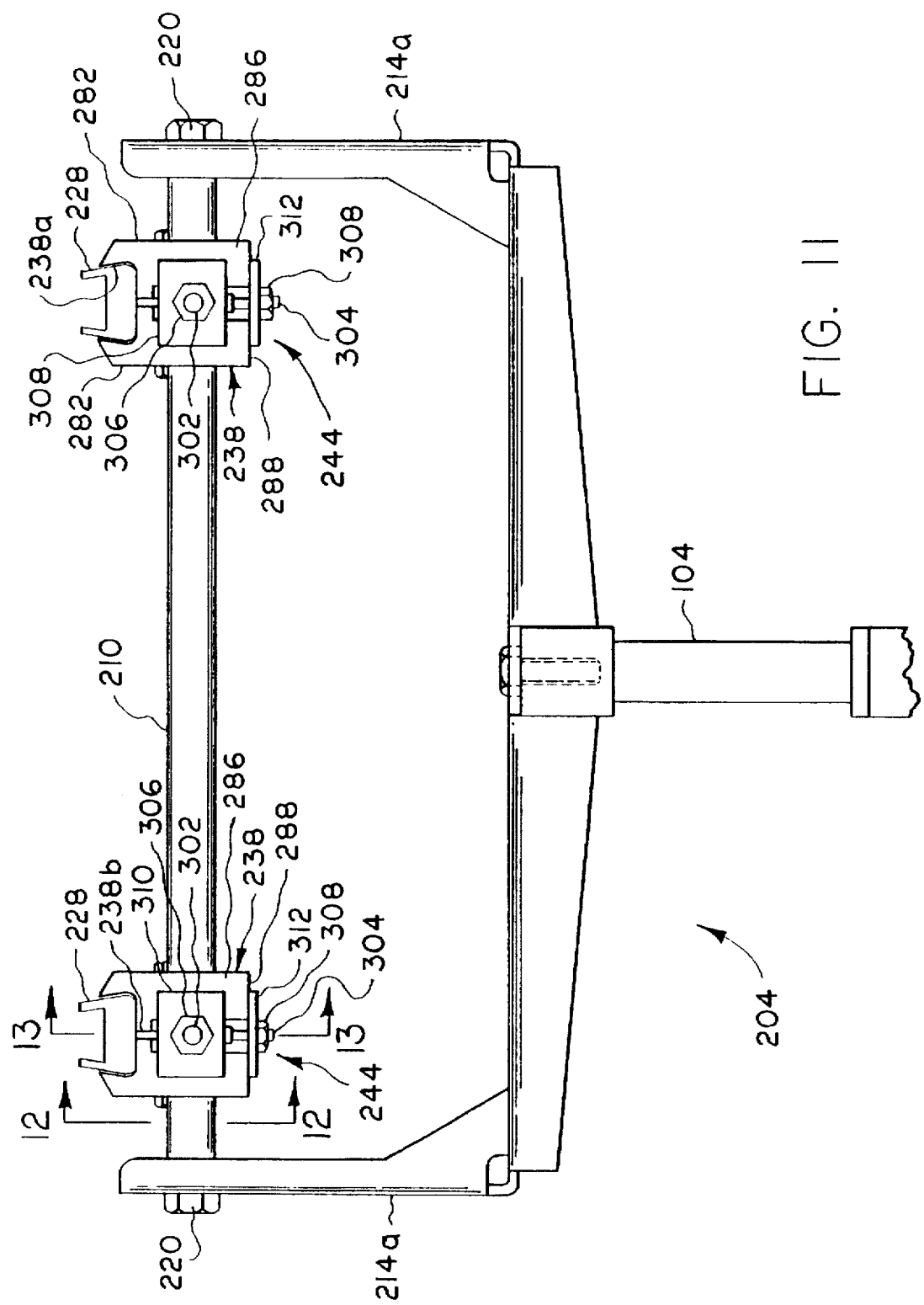
FIG. 11 is a sectional view taken generally along the line 11—11 in FIG. 10.
Figure 12:
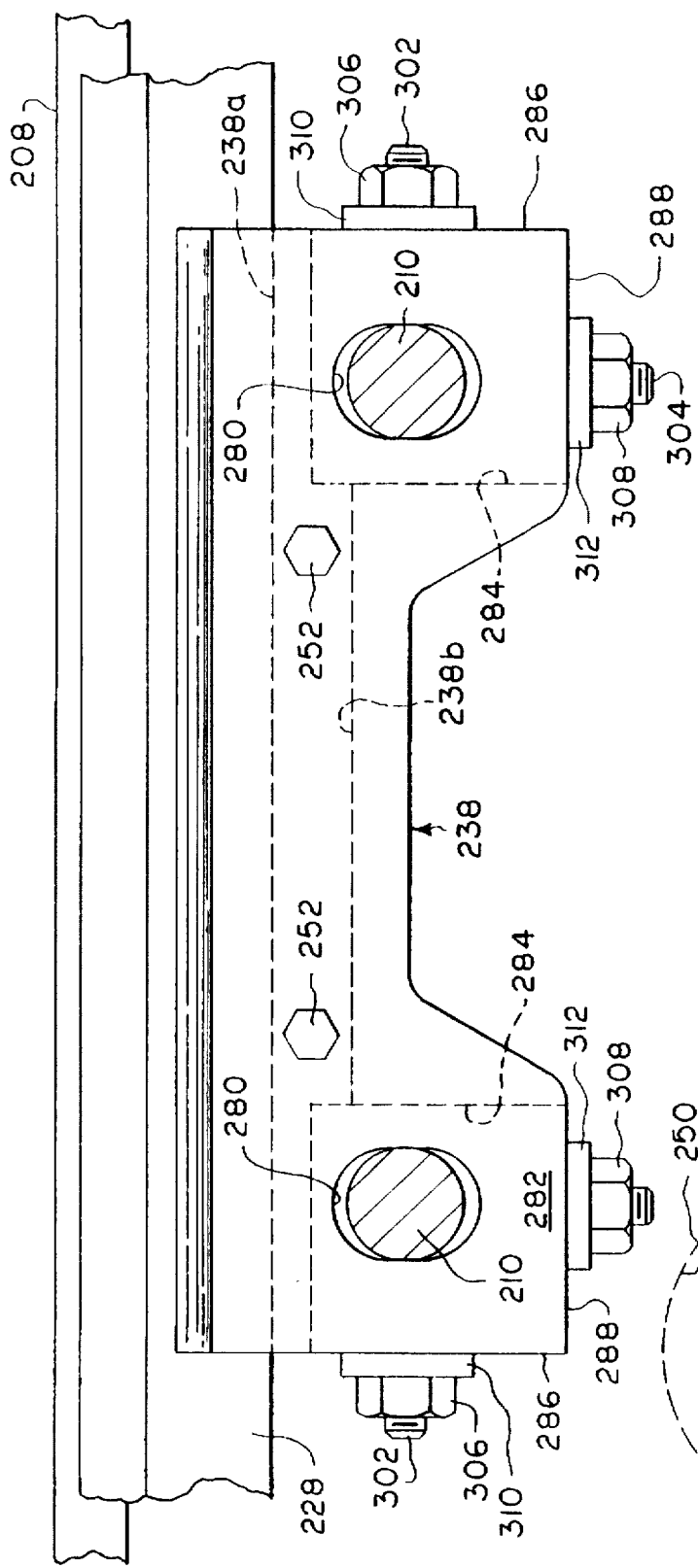
FIG. 12 is a sectional view taken generally along the line 12—12 in FIG. 11.
Figure 15:
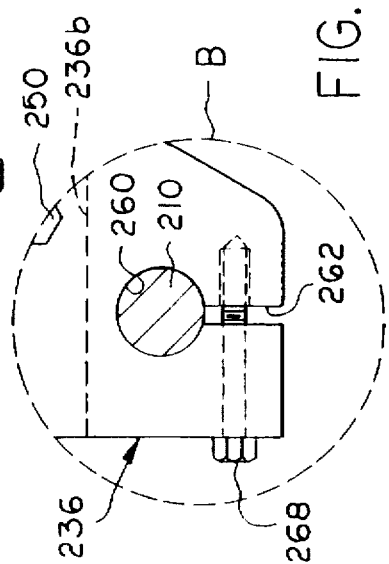
FIG. 15 is an enlarged view of the area designated as B in FIG. 10.

Sections 202, 204 and 206 are of similar construction in that they each include a pair of parallel support elements, which are disposed to extend horizontally and transversely of the path of travel and shown as 210 only for the case of infeed section 202 and weighing section 204 in FIGS. 11, 12 and 15. The pairs of support elements are mounted on connector brackets 212, 214 and 216 by threaded bolts 218, 220 and 222 passing through parallel upstanding flanges 212a, 214a and 216a of the connector brackets for receipt within threaded openings, not shown, which open axially through the ends of the support elements. Connector brackets 212, 214 and 216 are preferably coupled to upstand above three first spine clamping brackets of the type shown at 96 in FIGS. 5 and 6 in order to permit the sections to be individually removably and adjustably fixed to spine 12 in desired locations spaced lengthwise thereof. In the case of weighing station 204, connector bracket 214 would be connected to the top of load cell 104, which would in turn be connected to a standard, not shown, upstanding from a first spine-clamping bracket.

Each of sections 202, 204 and 206 additionally includes chain element support means for mounting each of the chains elements on their associated support elements, which comprise elongated runners 226, 228 and 230 for slidably supporting chain elements passing thereover, elongated runner supports 236, 238 and 240, having lengthwise extending grooves 236a, 238a and 240a for slidably supporting their associated runners, and pairs of adjustable mounting means 242, 244 and 246 provided adjacent each end of the runner supports for adjustably mounting same on the support elements. Runners 226, 228 and 230 are releasably clamped within grooves 236a, 238a and 240a by means of threaded bolts 250, 252 and 254 arranged to extend across slots, which open upwardly into the grooves as shown only for the case of slots 236b and 238b in FIGS. 11–15. Runner supports 236 and 240 are similar in that their adjustable mounting means 242 and 246 include transversely extending bore openings, shown at 260 in FIG. 15 only for the case of runner support 236, which serve to slidably receive their associated support elements. These bore openings communicate with slots 262 and 266, and clamping bolts 268 and 272 extend across these slots to effect clamping of the support elements within the bore openings. With this construction, runner supports 236 and 240, and thus runners 226 and 230, may be adjustably fixed to their associated support elements to vary the distance between the chain elements, and runners 236 and 240 may be adjustably fixed in desired positions lengthwise within grooves 236a and 240a in a direction lengthwise of the path of conveyor travel.

Figure 10:
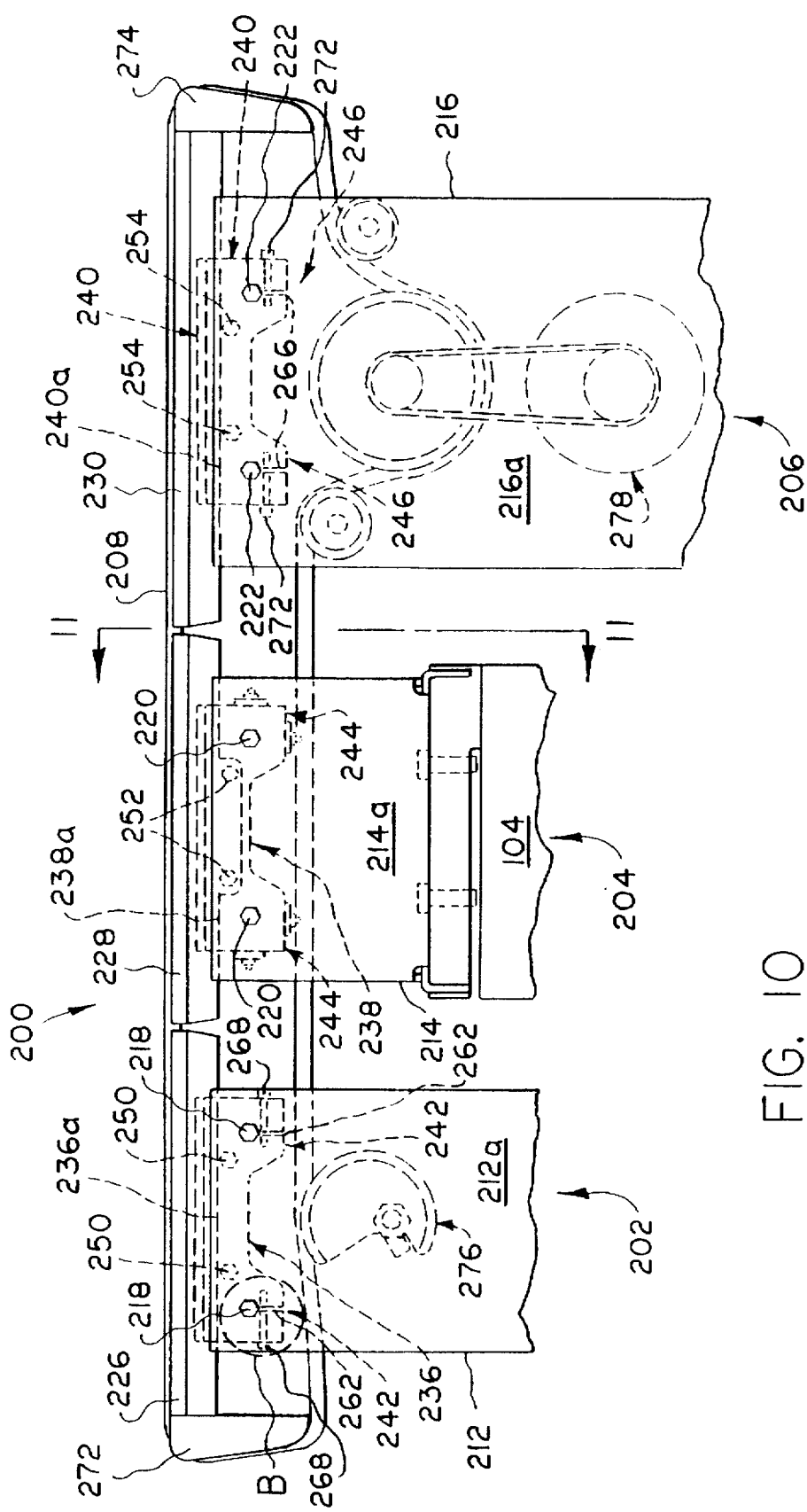
FIG. 10 is a side elevational view showing for example another type of modular conveyor adapted for mounting on the framework of FIG. 1.

As desired, infeed and outfeed sections 202 and 206 may be completed by providing appropriate chain guides 272 and 274, chain tension control devices, only one of which is shown in FIG. 10, 276 and a conveyor drive, including motor 278.

By now referring to FIGS. 11–14, it will be noted that the opposite ends of runner support 238 are formed with generally oval-shaped openings 280 and 280, which open transversely through opposite side surfaces 282 and 282 of the runner support and slidably receive support elements 210, as best shown in FIG. 12. These opposite ends of runner support 238 are also formed with adjustment slots 284 and 284 which communicate with openings 280 and 280, and open outwardly through end surfaces 286 and 286, and lower surfaces 288 and 288.

Adjustable mounting means 244 are best shown in FIGS. 13 and 14 as including first and second clamping means 290 and 292 having first ends 294 and 296 arranged within one of slots 284 and formed with openings 298 and 300 sized to slidably receive one of support elements 210 and threaded second ends 302 and 304 arranged to project outwardly of such slot in directions extending lengthwise and vertically, respectively, relative to runner support 238. Preferably, first end 294 of first clamping means 290 is bifurcated as best shown in FIG. 14. Threaded second ends 302 and 304 threadably engage with clamping nuts 306 and 308 arranged to bear against end and lower surfaces 286 and 288 via clamping plates or washers 310 and 312, respectively.

With the construction shown in FIGS. 11–14, loosening of nuts 306 and 308 permits adjustment of runner supports 238 lengthwise of support elements 210 and 210 thereby to vary the horizontal distance between chain elements 208. Loosening of nuts 306 and 308 also permits adjustment of the runner supports and thus the chain elements vertically relative to the support elements. Preferably, openings 280 are sized to engage with support elements 210 in order to prevent relative horizontal movement there between during adjustment of runner supports 238 lengthwise and/or vertically relative to the support elements. Tightening of nuts 306 and 308 clamps runner supports 238 against movement relative to support elements 210 and 210. Fine adjustments of the distance between the ends of runners 228 and runners 226 and 230 may be made by loosening bolts 252 and 252 and sliding runners 228 lengthwise of grooves 238a into a desired position whereafter these bolts are tightened to clamp the runners in such position.

In the several forms of the invention described above, each conveyor unit or section is supported by a single standard upstanding relative to a single pair of spine-clamping brackets. However, it is contemplated that as the lengths of such conveyor unit or sections increase in a direction aligned with the direction of conveyor travel, it may be necessary to provide two or more standard and associated pairs of spine-clamping brackets for mounting purposes.

What is claimed is:

1. A modular conveyor system comprising in combination:

a framework, said framework including a horizontally elongated spine, a pair of supports depending one from each end of said spine, a pair of standards upstanding one from each of said supports and each of said standards including at least one mounting portion disposed above said spine in a horizontally offset relationship relative thereto, and at least one elongated rail having opposite ends thereof fixed one to each of said mounting portions;

at least one conveyor system art device;

mounting means for adjustably mounting said art device on said rail; and at least one modular conveyor unit having a conveyor element supported for movement along a path of travel and conveyor unit mounting means for adjustably mounting said conveyor unit on said spine in a selected position lengthwise thereof.

2. A modular conveyor system according to claim 1, wherein said conveyor unit mounting means includes a first bracket, a second bracket, said first and second brackets each having opposite free edge portions, and releasable clamp means engaging with said opposite free edge portions to releasably clamp said spine between said first and second brackets.

3. A modular conveyor system according to claim 2, wherein said spine is of generally square cross-sectional configuration and supported to arrange a first pair of adjacent side surfaces thereof to assume an inverted generally V-shaped configuration and define an upwardly facing clamping surface and a second pair of adjacent side surfaces thereof to assume a generally V-shaped configuration and define a downwardly facing clamping surface, and said first and second brackets engage with said upwardly and downwardly facing clamping surfaces, respectively.

4. A modular conveyor system according to claim 3, wherein said first bracket is of an inverted generally V-shaped configuration and said second bracket is of a generally M-shaped configuration.

5. A modular conveyor system according to claim 1, wherein each of said supports includes a pair of legs having upper ends thereof fixed to said spine, each of said standards additionally includes a pair of posts upstanding one post from each leg of said pair of legs, each said rail having lengthwise extending upper and lower edge portions, and each of said posts defines one of said mounting portions fixed to said rail vertically intermediate and spaced from said edge portions.

6. A modular conveyor system according to claim 1, wherein said spine is of generally square cross-sectional configuration and supported by said standards to arrange a first pair of adjacent side surfaces thereof to assume an inverted, generally V-shaped configuration and define an upwardly facing mounting surface and a second pair of adjacent side surfaces thereof to assume a generally V-shaped configuration and define a downwardly facing mounting surface, said conveyor unit mounting means includes a pair of brackets releasably clamped against said upwardly and downwardly facing mounting surfaces, and each of said supports includes a pair of legs having upper ends thereof fixed one to each of said second pair of adjacent side surfaces of said spine, and each of said standards additionally includes a pair of posts upstanding one from each leg of said pair of legs, and each of said posts has an upper end thereof defining one of said mounting portions.

7. A modular conveyor system according to claim 6, wherein said pair of brackets includes a first bracket having an inverted generally V-shaped configuration and a second bracket of generally M-shaped configuration, said first and second brackets each having opposite free edge portions, and releasable clamp means engage with said opposite free edge portions for releasably clamping said first and second brackets against said upwardly and downwardly facing surfaces, respectively.

8. A modular conveyor system according to claim 7, wherein said rail has upper and lower lengthwise extending opposite edges, and said mounting portion of each of said standards is fixed to a vertical mid portion of said rail in spaced relationship relative to said upper and lower edges thereof; and mounting means for adjustably mounting said art device includes clamping means defining recesses for slidably receiving said upper and lower edges of said rail throughout the lengthwise extent thereof.

9. A modular conveyor system according to claim 1, wherein said standards define mounting openings facing transversely outwardly of said spine, standard mounting means are arranged within said openings, and said framework additionally includes a pair of side panels each sized to extend horizontally lengthwise of said spine between said standards, each of said side panels having mounting means arranged to extend inwardly of said mounting openings for engagement with said standard mounting means for attaching said side panels to said standards.

10. In a conveyor system having a framework for mounting a conveyor adapted for movement along a path of travel extending in a direction lengthwise of said framework, the improvement comprising:

said framework including an elongated spine extending horizontally lengthwise of said framework and a pair of supports for supporting opposite ends of said spine, said spine having a generally square cross-sectional configuration and supported by said supports to arrange a first pair of adjacent side surfaces thereof to assume an inverted, generally V-shaped configuration and define an upwardly facing clamping surface and a second pair of adjacent side surfaces thereof to define a generally V-shaped configuration and define a downwardly facing clamping surface, each of said supports including a pair of spine supporting legs having upper ends affixed one to each of said second pair of adjacent side surfaces; and mounting means is provided to mount said conveyor on said spine, said mounting means includes a pair of spine-mounting brackets and releasable clamping means, said pair of spine-mounting brackets including a first bracket connected to said conveyor and having an inverted generally V-shaped configuration and a second bracket of generally M-shaped configuration, said first and second brackets each having opposite free edge portions arranged closely adjacent one another when said first and second brackets engage with said upwardly and downwardly facing clamping surfaces, respectively, said clamping means releasably clamp said edge portions to releasably clamp said brackets against said spine in an adjusted position lengthwise thereof, and said conveyor includes a conveyor element movably supported by a frame, and said mounting means also includes means for releasably connecting said frame to said first bracket comprising a connector bracket coupled to said first bracket and releasably engaging positioning means for gravity supporting said frame on said connector bracket in a fixed position relative thereto in a direction extending lengthwise of said spine, and latching means for releasably retaining said frame in said fixed position.

11. In a conveyor system having a framework for mounting a conveyor adapted for movement along a path of travel extending in a direction lengthwise of said framework, the improvement comprising:

said framework including an elongated spine extending horizontally lengthwise of said framework and a pair of supports for supporting opposite ends of said spine, said spine having a generally square cross-sectional configuration and supported by said supports to arrange a first pair of adjacent side surfaces thereof to assume an inverted, generally V-shaped configuration and define an upwardly facing clamping surface and a second pair of adjacent side surfaces thereof to define a generally V-shaped configuration and define a downwardly facing clamping surface, each of said supports including a pair of spine supporting legs having upper ends affixed one to each of said second pair of adjacent side surfaces; and mounting means is provided to mount said conveyor on said spine, said mounting means includes a pair of spine-mounting brackets and releasable clamping means, said pair of spine-mounting brackets including a first bracket connected to said conveyor and having an inverted generally V-shaped configuration and a second bracket of generally M-shaped configuration, said first and second brackets each having opposite free edge portions arranged closely adjacent one another when said first and second brackets engage with said upwardly and downwardly facing clamping surfaces, respectively, said clamping means releasably clamp said edge portions to releasably clamp said brackets against said spine in an adjusted position lengthwise thereof, and said conveyor includes a conveyor element movably supported by a frame, said mounting means includes means for releasably connecting said frame to said first bracket comprising a connector bracket coupled to said first bracket and having upstanding side flanges, dependant side flanges carried by said frame and arranged parallel to said upstanding side flanges, said upstanding and dependant side flanges having positioning means for gravity supporting said frame on said connector bracket in a fixed position in a direction extending lengthwise of said spine, and latching means for releasably retaining said frame in said fixed position.

12. A conveyor system according to claim 11, wherein said positioning means comprises a pair of pins fixed to each of said upstanding side flanges to project in a direction extending horizontally transversely of said spine and a pair of edge-opening recesses formed in said dependant side flanges and sized to removably slidably receive said pins upon lowering movement of said frame downwardly onto said connector bracket, and said latching means is carried by said upstanding and dependant side flanges.

13. A conveyor system according to claim 12, wherein said conveyor element is an endless conveyor belt and said frame mounts motor means for driving said belt.

14. In a conveyor system having a framework for mounting a conveyor adapted for movement along a path of travel extending in a direction lengthwise of said framework, the improvement comprising:

said framework including an elongated spine extending horizontally lengthwise of said framework and a pair of supports for supporting opposite ends of said spine, said spine having a generally square cross-sectional configuration and supported by said supports to arrange a first pair of adjacent side surfaces thereof to assume an inverted, generally V-shaped configuration and define an upwardly facing clamping surface and a second pair of adjacent side surfaces thereof to define a generally V-shaped configuration and define a downwardly facing clamping surface, each of said supports including a pair of spine supporting legs having upper ends affixed one to each of said second pair of adjacent side surfaces; and mounting means is provided to mount said conveyor on said spine, said mounting means includes a pair of spine-mounting brackets and releasable clamping means, said pair of spine-mounting brackets including a first bracket connected to said conveyor and having an inverted generally V-shaped configuration and a second bracket of generally M-shaped configuration, said first and second brackets each having opposite free edge portions arranged closely adjacent one another when said first and second brackets engage with said upwardly and downwardly facing clamping surfaces, respectively, said clamping means releasably clamp said edge portions to releasably clamp said brackets against said spine in an adjusted position lengthwise thereof, and said conveyor includes at least two conveyor chains, a pair of parallel support elements arranged to extend horizontally transversely of said path of travel and to be coupled to said first bracket, and a chain support means for mounting each of said chains on said support elements, each of said support means including an elongated runner for slidably supporting one of said chains, an elongated runner support having opposite ends, and a pair of adjustable mounting means provided one adjacent each of said opposite ends for adjustably mounting said runner support on said support elements for movement both lengthwise and vertically thereof.

15. A conveyor system according to claim 14, wherein each of said adjustable mounting means includes first and second clamping means slidably supported by one of said support elements for movement lengthwise thereof and adjustably carried by one of said opposite ends for adjustably moving said one of said opposite ends lengthwise and vertically of said one of said support elements.

16. A conveyor system according to claim 14, wherein each said runner support is formed with an upwardly opening and lengthwise extending groove for slidably supporting one of said runners for movement relative to said runner support in a direction extending lengthwise of said spine and carries means for releasably clamping said one of said runners in a desired adjustment position lengthwise of said groove, and said opposite ends are formed with lower surfaces, end surfaces, opposite side surfaces, and transversely extending openings passing through said opposite side surfaces for loosely receiving said support elements and adjustment slots communicating with said transversely extending openings, said adjustment slots opening outwardly through both said end surfaces and said lower surfaces, and each of said adjustable mounting means includes first and second clamping means having first ends thereof arranged within one of said slots and formed with through openings for slidably receiving one of said support elements and second ends projecting outwardly of said one of said slots in directions extending lengthwise and vertically relative to said runner support, respectively, and said second ends of said first and second clamping means threadably engage with clamping nuts arranged to bear on said end and lower surfaces, respectively.

17. A conveyor system according to claim 16, wherein said transversely extending openings constrain against relative movement of said runner supports and said support elements in a direction extending lengthwise of said runner supports.

18. In a conveyor system having a framework for mounting a conveyor adapted for movement along a path of travel extending in a direction lengthwise of said framework, the improvement comprising:

said framework including an elongated spine extending horizontally lengthwise of said framework and a pair of supports for supporting opposite ends of said spine, said spine having a generally square cross-sectional configuration and supported by said supports to arrange a first pair of adjacent side surfaces thereof to assume an inverted, generally V-shaped configuration and define an upwardly facing clamping surface and a second pair of adjacent side surfaces thereof to define a generally V-shaped configuration and define a downwardly facing clamping surface, each of said supports including a pair of spine supporting legs having upper ends affixed one to each of said second pair of adjacent side surfaces; and mounting means is provided to mount said conveyor on said spine, said mounting means includes a pair of spine-mounting brackets and releasable clamping means, said pair of spine-mounting brackets including a first bracket connected to said conveyor and having an inverted generally V-shaped configuration and a second bracket of generally M-shaped configuration, said first and second brackets each having opposite free edge portions arranged closely adjacent one another when said first and second brackets engage with said upwardly and downwardly facing clamping surfaces, respectively, said clamping means releasably clamp said edge portions to releasably clamp said brackets against said spine in an adjusted position lengthwise thereof, and said conveyor includes a flexible element trained about parallel guide members arranged adjacent infeed and outfeed ends of said conveyor and a tensioning mechanism is provided for adjustably supporting one of said guide members for movement relative to the other for tensioning said conveyor element in the direction of travel thereof from said infeed end to said outfeed end, said tensioning mechanism comprises a pair of like tensioning devices, each of said devices including a guide means, a slide member having a first end supported by said guide means for sliding movement aligned with said direction of travel and a second end for mounting an end of said one of said guide members, adjustment means for defining a reference surface adjustably positioned lengthwise of said direction of travel, an operator supported on said slide member for sliding movement therewith in said direction of travel and being manually movable relative to said slide member between tension release and tensioning positions, said operator being engageable with said reference surface to move said guide member into a conveyor element tensioned position incident to movement of said operator from said tension release position into said tensioning position thereof, and said slide member and said operator are slidably removable from said guide means in a direction aligned with said direction of travel.

19. A conveyer system according to claim 18, wherein said guide means defines a bore opening and a slot opening therethrough radially and lengthwise of said bore opening, said first end of said slide member is a cylindrical pin slidably and rotatably received within said bore opening, and said operator is rotatably supported on said slide member by a stud slidably received within said slot and cooperating therewith to prevent rotation of said first end within said bore opening.

20. A conveyer system according to claim 19, wherein said adjustment means includes an adjustment opening arranged parallel to said bore opening and having one end threaded to receive an adjustment bolt and an opposite end slidably supporting an adjustment pin, said adjustment pin having one end engageable by said adjustment bolt and an opposite end defining said reference surface, said adjustment pin is slidably removable from said adjustment opening in alignment with said direction of travel, and said operator is formed with a cam surface arranged for engagement with said reference surface.

21. A conveyor mechanism comprising in combination:
a supporting framework; and
at least one modular conveyor unit including a frame, a conveyor element supported on said frame for movement along a path of travel, and drive means supported by said frame for effecting movement of said conveyor element, said framework and said frame having means engageable upon lowering of said frame onto said framework for locating said frame in a position relative to said framework both in directions extending in alignment with and transversely of said path of travel, said means engageable upon lowering of said frame includes parallel flanges depending from said frame and parallel flanges upstanding from said framework and arranged for sliding surface-to-surface engagement with said depending flanges to constrain said frame against movement relative to said framework horizontally transversely of said path of travel, and slidably engaging pin and recess means carried by said depending and upstanding flanges for supporting said frame on said framework and constraining said frame against movement relative to said framework in alignment with said path of travel; and latch means for releasably retaining said frame in said position.

22. In a conveyor mechanism comprising in combination:
a supporting framework; and
at least one modular conveyor unit including a frame, a conveyor element supported on said frame for movement along a path of travel, and drive means supported by said frame for effecting movement of said conveyor element, said framework and said frame having means engageable upon lowering of said frame onto said framework for locating said frame in a position relative to said framework both in directions extending in alignment with and transversely of said path of travel, said means engageable upon lowering of said frame includes a pair of parallel flanges depending from said frame and parallel flanges upstanding relative to said framework, a pair of pins mounted on each of said upstanding flanges to extend horizontally transversely of said path of travel, and a pair of edge-opening recesses defined by each of said depending flanges for slidably receiving said pins, said dependant and upstanding flanges engaging to constrain said frame against movement in a direction horizontally transversely of said path of travel, said pins and said edge opening recesses engaging to support said frame on said framework and to constrain said frame against movement in a direction aligned with said path of travel, and latch means carried by said depending and upstanding flanges for releasably retaining said frame in said position.

23. A conveyor unit comprising:
support means;
at least two conveyor chains; and
means for mounting said chains on said support means for movement along a path of travel, and for adjustment horizontally transversely of said support means to vary the horizontal distance between said conveyor chains and vertically of said support means.

24. A conveyor unit according to claim 23, wherein said means for mounting said chains includes a pair of parallel support elements carried by said support means and arranged to extend horizontally transversely of said path of travel; at least two chain supports for slidably supporting said chains during movement thereof along said path of travel; and means to adjustably fix opposite ends of said chain supports one on each of said support elements for adjustment lengthwise thereof, thereby to adjustably vary said horizontal distance between said chains and for adjustment vertically of said support elements, thereby to adjustably move said chains vertically relative to said support means.

25. A conveyor unit according to claim 24, wherein said chain supports include runners for slidably supporting said chains and means to adjustably position said runners relative to said support elements in a direction aligned with said path of travel.

26. In a conveyor of the type including a support and at least two conveyor chain element supporting runners for individually slidably supporting at least two chain elements incident to movement of said chain elements along a path of travel extending lengthwise of said support, the improvement of means for adjustably positioning said runners relative to each other and said support comprising:
a pair of parallel support elements carried by said support and extending horizontally transversely of said path of travel;
at least two elongated runner supports each having an upwardly opening groove for slidably supporting one of said runners and means for releasably clamping said one of said runners within said groove for adjustment lengthwise thereof, said runner supports having transversely extending and vertically elongated openings adjacent opposite ends thereof for loosely receiving said support elements, and said opposite ends mounting clamping means engageable with said support elements to releasably clamp said runner supports relative to said support elements in desired portions lengthwise thereof to vary the horizontal distance between said runner supports and in desired positions vertically of said vertically elongated openings thereby to vary the vertical distance between said runners and said support.

27. In a conveyor of the type having at least two conveyor chains and at least two runners carried by a support for slidably supporting said chains for movement along a path of travel, the improvement, wherein said runners are mounted on said support by:
a pair of parallel support elements carried by said support to extend horizontally transversely of said path of travel;
an elongated runner support for each runner and having opposite ends thereof formed with a pair of transversely extending openings for loosely receiving said support elements and a pair of outwardly opening slots arranged one in communication with and to extend transversely of each of said openings; and
a pair of clamping devices associated one with each of said slots and having first ends formed with openings for slidably receiving one of said support elements and second ends threaded to receive nuts arranged to bear against one threaded to receive nuts arranged to bear against one of said opposite ends to selectively retain said runner support in an adjusted position vertically and lengthwise of said support elements.

28. A framework for mounting a conveyor having a path of travel, said framework comprising:
a conveyor supporting spine elongated in a direction aligned with said path of travel;
legs depending from said spine for supporting said spine in an essentially horizontally disposed position;
a pair of posts upstanding from a pair of said legs arranged adjacent one transverse side of said spline;
an elongated rail arranged above and in a horizontal offset relationship related to said spline and having opposite ends thereof fixed one to each post of said pair of posts;
a side panel sized to extend horizontally lengthwise of said spine and having opposite ends mounted one on each post of said pair of posts.

29. A framework according to claim 28, wherein said spine is of generally square cross-sectional configuration and supported by said legs to arrange a first pair of adjacent side surfaces of said spine to assume an inverted generally V-shaped configuration and a second pair of adjacent side surfaces of said spine to assume a generally V-shaped configuration, said legs having upper ends thereof connected to said second pair of adjacent side surfaces.

30. A framework according to claim 28, wherein said pair of posts define mounting openings facing transversely away from said spine and having mounting means arranged within said mounting openings.

31. A framework according to claim 30, wherein said mounting means arranged within said mounting openings includes a pair of mounting rods extending horizontally and transversely within each said mounting opening, and said mounting means carried adjacent each of said opposite ends includes a pair of mounting hooks adapted to overlie in engagement with said mounting rods.

32. A framework according to claim 31, wherein said panel includes a central portion and a pair of end caps fixed one to each end of said central portion, and each said pair of mounting hooks is mounted on a mounting plate fixed within one of said end caps.

33. A framework according to claim 30, wherein said pair of posts having mounting portions extending transversely away from said spine adjacent upper ends of said mounting openings and said opposite ends of said rail are fixed to said mounting portions.

* * * * *

UNITED STATES PATENT AND TRADEMARK OFFICE
CERTIFICATE OF CORRECTION

PATENT NO. : 5,797,481
DATED : August 25, 1998
INVENTOR(S) : John E. Uber, Carl A. Matson, & Eugene A. Helmetsie It is certified that error appears in the above-identified patent and that said Letters Patent is hereby corrected as shown below:

In Claim 27, line 34 "threaded to receive nuts arranged to bear against one" is duplicated again on line 35

In Claim 30, line 63 change "having" to "have"

In Claim 30, line 64, after "openings" delete "." and insert "and said side panel has mounting means carried adjacent each of said opposite ends thereof and arranged to extend inwardly of said mounting openings for engagement with said mounting means arranged within said mounting openings."

Signed and Sealed this

Sixth Day of April, 1999

Attest:

Q. TODD DICKINSON

*Attesting Officer*  *Acting Commissioner of Patents and Trademarks*